(12) United States Patent
Scanu et al.

(10) Patent No.: US 10,852,751 B2
(45) Date of Patent: Dec. 1, 2020

(54) BUILDING BOTS INTERFACING WITH SECURITY SYSTEMS

(71) Applicant: Sensormatic Electronics, LLC, Boca Raton, FL (US)

(72) Inventors: Alessandro Scanu, Cork (IE); Ana Vinogradova, Cork (IE); James Murphy, Cork City (IE); Christopher Cianciolo, Westford, MA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 230 days.

(21) Appl. No.: 16/027,468

(22) Filed: Jul. 5, 2018

(65) Prior Publication Data

US 2019/0010750 A1 Jan. 10, 2019

Related U.S. Application Data

(60) Provisional application No. 62/529,546, filed on Jul. 7, 2017.

(51) Int. Cl.
*G05D 1/10* (2006.01)
*E05F 15/73* (2015.01)
(Continued)

(52) U.S. Cl.
CPC ............ *G05D 1/106* (2019.05); *E05B 51/00* (2013.01); *E05F 15/73* (2015.01); *G05D 1/0011* (2013.01); *G05D 1/0055* (2013.01); *G05D 1/0088* (2013.01); *G07C 9/15* (2020.01); *G07C 9/20* (2020.01); *E05F 2015/767* (2015.01); *E05Y 2400/44* (2013.01); *E05Y 2400/45* (2013.01); *E05Y 2900/132* (2013.01);
(Continued)

(58) Field of Classification Search
CPC ... G07C 9/15; G07C 9/20; E05F 15/73; E05F 2015/767; G05D 1/0055; G05D 1/0011; G05D 1/0088; G05D 2201/0215; G05D 1/0246; G05D 1/101; G05D 2201/0207; G05D 1/106; E05B 51/00; E05Y 2400/44; E05Y 2900/132; E05Y 2400/45
USPC .................................. 340/5.1–5.73; 700/245
See application file for complete search history.

(56) References Cited

U.S. PATENT DOCUMENTS 5,012,455 A * 4/1991 Schwarz ................. G01S 15/87
367/93
10,310,499 B1 * 6/2019 Brady .................. G05D 1/0027
(Continued)

*Primary Examiner* — Brian Wilson
(74) *Attorney, Agent, or Firm* — Foley & Lardner LLP

(57) ABSTRACT

Techniques for an autonomous mobile unmanned machine such as an unmanned aerial vehicle or drone or a robot to access a closed door are described. The techniques include programming the autonomous mobile unmanned machine to pass through a particular location within a facility that has one or more doors, and sense by the autonomous mobile unmanned machines a beacon signal emanating from a beacon deployed in proximity to a first one of the one or more doors in the facility, by receiving the beacon signal by a receiver device on the autonomous mobile unmanned machines. The techniques send a message to either a server or an access control system when the autonomous mobile unmanned machines determines that it needs access through the door at the specified location identified by the beacon and receives a message from either the server or the access control system that the door has been unlocked.

20 Claims, 7 Drawing Sheets

(51) Int. Cl.
*G05D 1/00* (2006.01)
*E05B 51/00* (2006.01)
*G07C 9/20* (2020.01)
*G07C 9/15* (2020.01)
*G05D 1/02* (2020.01)

(52) U.S. Cl.
CPC ... *G05D 1/0246* (2013.01); *G05D 2201/0207* (2013.01); *G05D 2201/0215* (2013.01)

(56) References Cited

U.S. PATENT DOCUMENTS

2016/0107749 A1    4/2016  Mucci
2016/0116914 A1    4/2016  Mucci
2017/0225321 A1*   8/2017  Deyle .................... B25J 9/1679

* cited by examiner

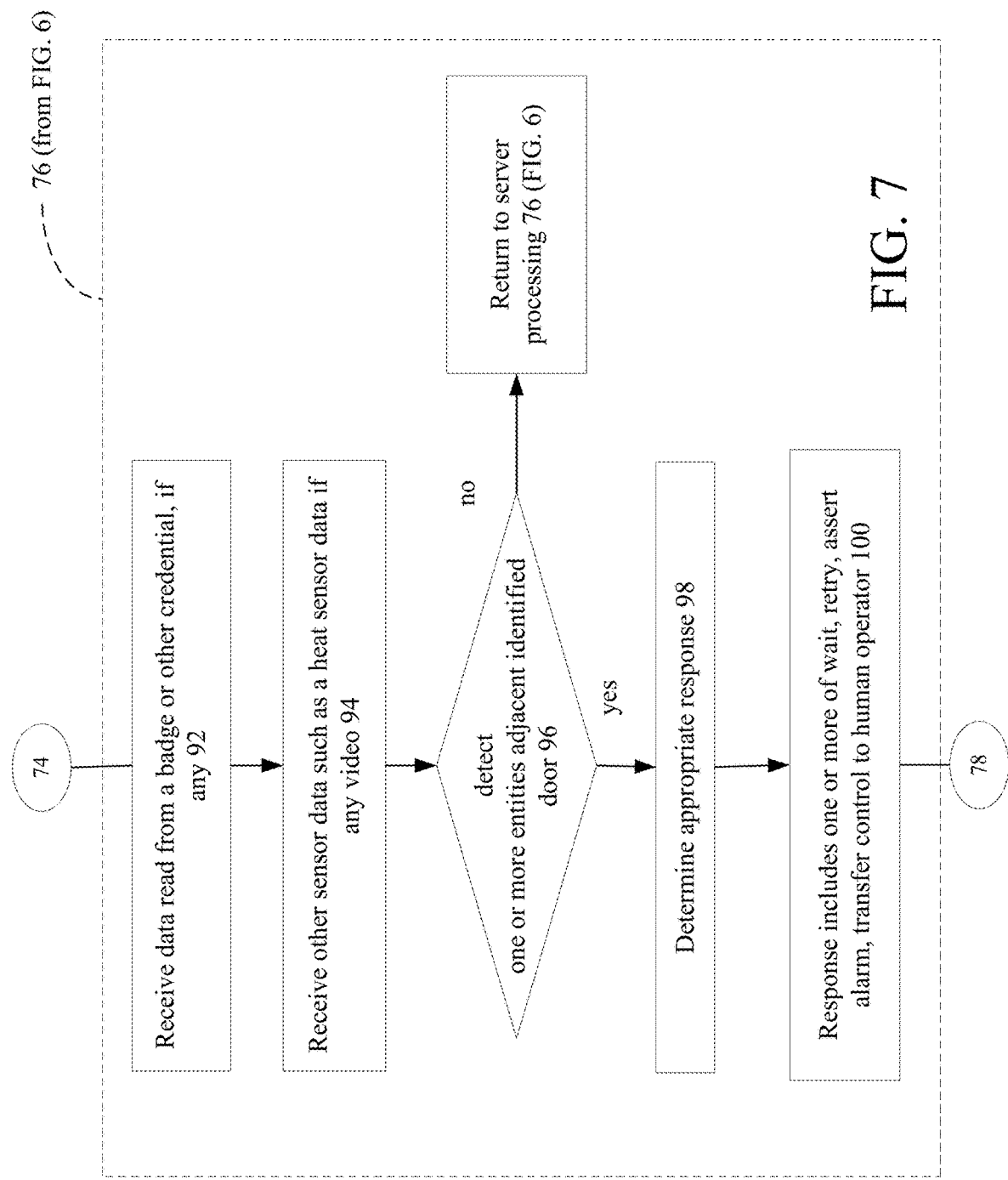

BUILDING BOTS INTERFACING WITH SECURITY SYSTEMS

CLAIM OF PRIORITY

This application claims priority under 35 U.S.C. § 119(e) to provisional U.S. Patent Application 62/529,546, filed on Jul. 7, 2018, entitled: "BUILDING BOTS INTERFACING WITH SECURITY SYSTEMS", the entire contents of which are hereby incorporated by reference.

BACKGROUND

This description relates to operation of security systems in conjunction with autonomous mobile unmanned machines.

Commercial security systems include surveillance and access control systems. Conventionally, those systems were manned by humans, such as those that regularly traversed a facility checking in at clocking stations and manned entrances, from which the humans made observations. Surveillance systems progressed to include closed circuit television monitoring. More recently integrated systems have been developed to include video cameras installed at strategic locations in a facility. These video cameras are in communication with a centralized remote monitoring facility and operators at the facility visually sweep the facility from the monitoring center. These sweeps are scripted and timed at a user request. Upon discovery of suspicious activity, the operator can engage in a custom designed response plan.

Surveillance solutions have been discussed with respect to the use of autonomous mobile unmanned machines such as unmanned aerial vehicles, commonly referred to as drones, as discussed in US-2016-0116914-A1 "Drone Tours In Security Systems" or in US-2016-0107749-A1 "Fixed Drone Visualization In Security Systems." Other approaches to surveillance suggest the use of robots of various types. Another example of an autonomous mobile unmanned machine is an autonomous cleaning robot.

SUMMARY

Conventional commercial types of surveillance systems require a significant investment in video cameras to cover all critical areas and yet the video cameras can be prone to missing conditions or areas. For example, video surveillance systems covering large areas or space require many cameras, large amount of media storage (local DVRs or remote hosting), video management tools to investigate the accumulated information from all the cameras, and analytics for each of the many streaming video channels from the many cameras. This applies to both systems that are completely wired and those that use some degree of wireless technology.

Some commercial applications require a more cost efficient solution. Limitations of conventional commercial systems are significant causes of missed conditions, as well as false alarms that can cost alarm monitoring companies, building owners, security professionals and/or police departments significant amounts of money and wasted time that would otherwise be spent on real intrusion situations.

One practical problem in employing autonomous mobile unmanned machines, which include drones or robots in commercial premises protected with security systems, is the problem of door access in a manner that not only allows an autonomous mobile unmanned machine, e. g., robot or drone to pass through a door but to do so in a secure manner. This concern applies irrespective of the purpose of the drone or robot. While drones may be employed primarily for surveillance, robots can be employed for other functions as well including cleaning of a commercial premises.

One aspect of autonomous cleaning robots is passage through closed doors. While humans can carry badges and can easily open closed doors that is not generally the situation with a robot or drone or other types of portable vehicle platforms, i.e., autonomous mobile unmanned machines.

According to an aspect, a method includes programming an autonomous mobile unmanned machine to pass through a particular location within a facility that has one or more doors, receiving by the autonomous mobile unmanned machine a beacon signal emanating from a beacon deployed in proximity to a first one of the one or more doors in the facility, by receiving the beacon signal by a receiver device on the autonomous mobile unmanned machine, determining by the autonomous mobile unmanned machine whether the autonomous mobile unmanned machine needs access through the first door, sending a message to either a server or an access control system when the autonomous mobile unmanned machine determines that it needs access through the door at the specified location identified by the beacon, and receive a message from either the server or the access control system.

According to an aspect, a method includes receiving by a server or access control system a message from an autonomous mobile unmanned machine, which is a request by the autonomous mobile unmanned machine for access through a door, and determining whether the autonomous mobile unmanned machine is authorized to gain access through the door, and if so sending a message to the access control system to cause electronic locks on the door to unlock the identified door.

According to an additional aspect, an autonomous mobile unmanned machine includes a computer carried by the autonomous mobile unmanned machine to control passage of the autonomous mobile unmanned machine, at least one sensor carried by the autonomous mobile unmanned machine, with the computer configured to cause the autonomous mobile unmanned machine to pass through a facility and when arriving at a door within the facility, receive by the autonomous mobile unmanned machine a beacon signal emanating from a beacon deployed in proximity to a first one of the one or more doors in the facility, by receiving the beacon signal by a receiver device on the autonomous mobile unmanned machine, determine by the autonomous mobile unmanned machine whether the autonomous mobile unmanned machine needs access through the first door, send a message to either a server or an access control system when the autonomous mobile unmanned machine determines that it needs access through the door at the specified location identified by the beacon, and receive a message from either the server or the access control system that the door has been unlocked.

According to an additional aspect, an access control system includes a computing system, configured to receive from an autonomous mobile unmanned machine a message that an autonomous mobile unmanned machine needs access through a door, determining whether the autonomous mobile unmanned machine is authorized to gain access through the door, exchanging credentials with the autonomous mobile unmanned machine to cause the system to authenticate the autonomous mobile unmanned machine, receive sensor data by detecting one or more badges or other credentials or other devices indicating a presence of one or more entities in proximity to the door, process the received sensor data and when the sensor data indicates that any of the badges detected and/or read in the area around the door are not authorized access through the door, the server will issue an indication the autonomous mobile unmanned machine to wait and retry at a future time, and otherwise send a message from either to unlock the door.

The following are some additional features. The facility includes detectors/sensors that read badges or other credentials or other devices, and the method includes detecting by reading of the badges or other credentials or other devices a presence of one or more entities in proximity to the door. The autonomous mobile unmanned machine is a robot or a drone and the sent message is a request to open the specific identified door. When any of the badges are detected and/or read in the area around the door are not authorized to access through the door, the server will issue an indication as an alarm or a message to the autonomous mobile unmanned machine to wait and retry at a future time and asserts another type of alarm. A camera captures video processed by video analytics to determine if any other entities are adjacent the door. The autonomous mobile unmanned machine is a drone or robot and upon detection of unauthorized entities, the method includes modifying a drone fly pattern or a robot movement pattern to wait until the other entities have passed. When an intrusion is detected by within a facility, the detecting systems send messages to the server or access control which suspend all autonomous mobile unmanned machine movements through closed doors. The autonomous mobile unmanned machine is configured to exchange credentials with the access control system and/or the security system to cause access control system and/or the security system to authenticate the autonomous mobile unmanned machine. The autonomous mobile unmanned machine is a robot or a drone and the sent message is a request to open the specific identified door.

Aspects also include various types of autonomous mobile unmanned machines, computer program products tangible stored on a physical, a non-transitory hardware storage device or devices or systems and computer implemented methods.

The above techniques can include additional features and may provide one or more of the following advantages.

The use of autonomous mobile unmanned machines such as drones and robots and concomitant analysis of information/data provided by the drones would likely significantly reduce the rate of false alarms while providing more robust surveillance monitoring at lower costs than many current techniques. Reducing false alarms would likely minimize costs borne by alarm monitoring companies, building owners, and security professionals, and better utilize police department resources to handle real intrusion situations.

The details of one or more embodiments of the invention are set forth in the accompanying drawings and the description below. Other features, objects, and advantages of the invention is apparent from the description and drawings, and from the claims.

DESCRIPTION OF DRAWINGS

FIG. 1A is a blown up view of a portion of FIG. 1.

FIGS. 6-7 are flow diagrams of access processing.

DETAILED DESCRIPTION

Figure 1:
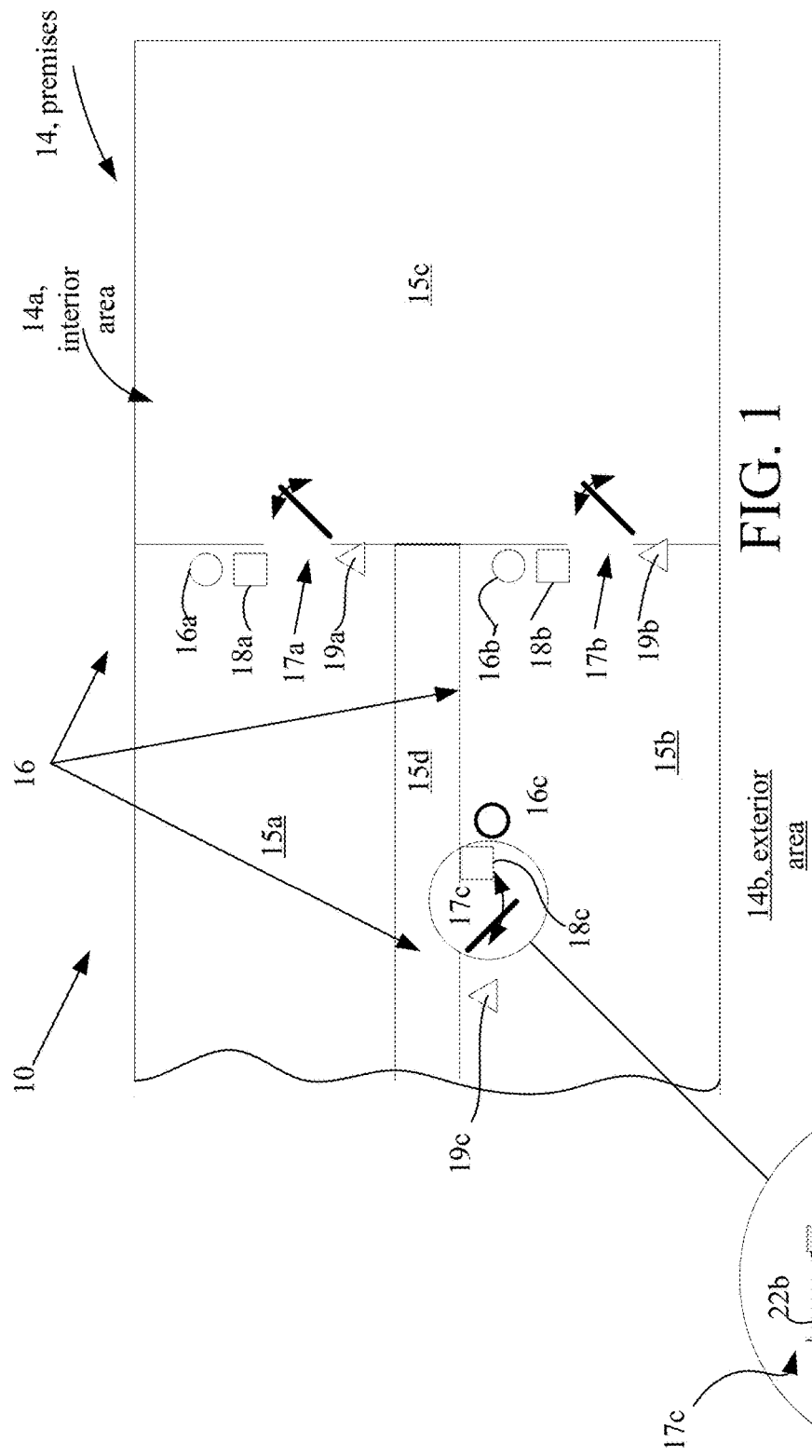
FIGS. 1 and 2 are schematic diagrams of a premises including a surveillance system at a facility with modified access control.

Referring now to FIG. 1, an example application 10 of a security system (not shown) installed at a facility 14, a portion of which, is shown. In this example, the facility 14 is, e.g., a commercial, industrial, facility, with interior areas, 14a (a portion of a building as shown) and exterior areas 14b that are subject to surveillance. The buildings 14 can be of any configuration, having wide open spaces such as a warehouse, to compartmentalized facilities such as labs/offices, but which have one and generally many doors that are secured by access control system(s) 16.

The security system (illustrated more fully in FIG. 2) includes video cameras, access control devices (credential readers) and secured doors that are secured by electronic locks that require proper authentication in order for a user to be allowed access through (under non-emergency conditions). The security system may include other systems such as fire detection, intrusion detection, etc.

In this illustrative example, the facility 14 includes three secured rooms 15a-15c and a single long hallway 15d. Room 15a has a doorway 17a and has associated therein an access controller 16a, an ingress card reader 18a, and a proximity sensor 19a (part of access control system 16). Room 15b has two doorways 17b and 17c each having associated access controllers access controllers 16b, 16c, ingress card readers 18b, 18c and proximity sensors 19b, 19c, respectively. The hallway 15d has the doorway 17c. A detailed typical view of a doorway is shown in FIG. 1A with exemplary door locks 22a, 22b controlled by access controller 16c.

Figure 2:
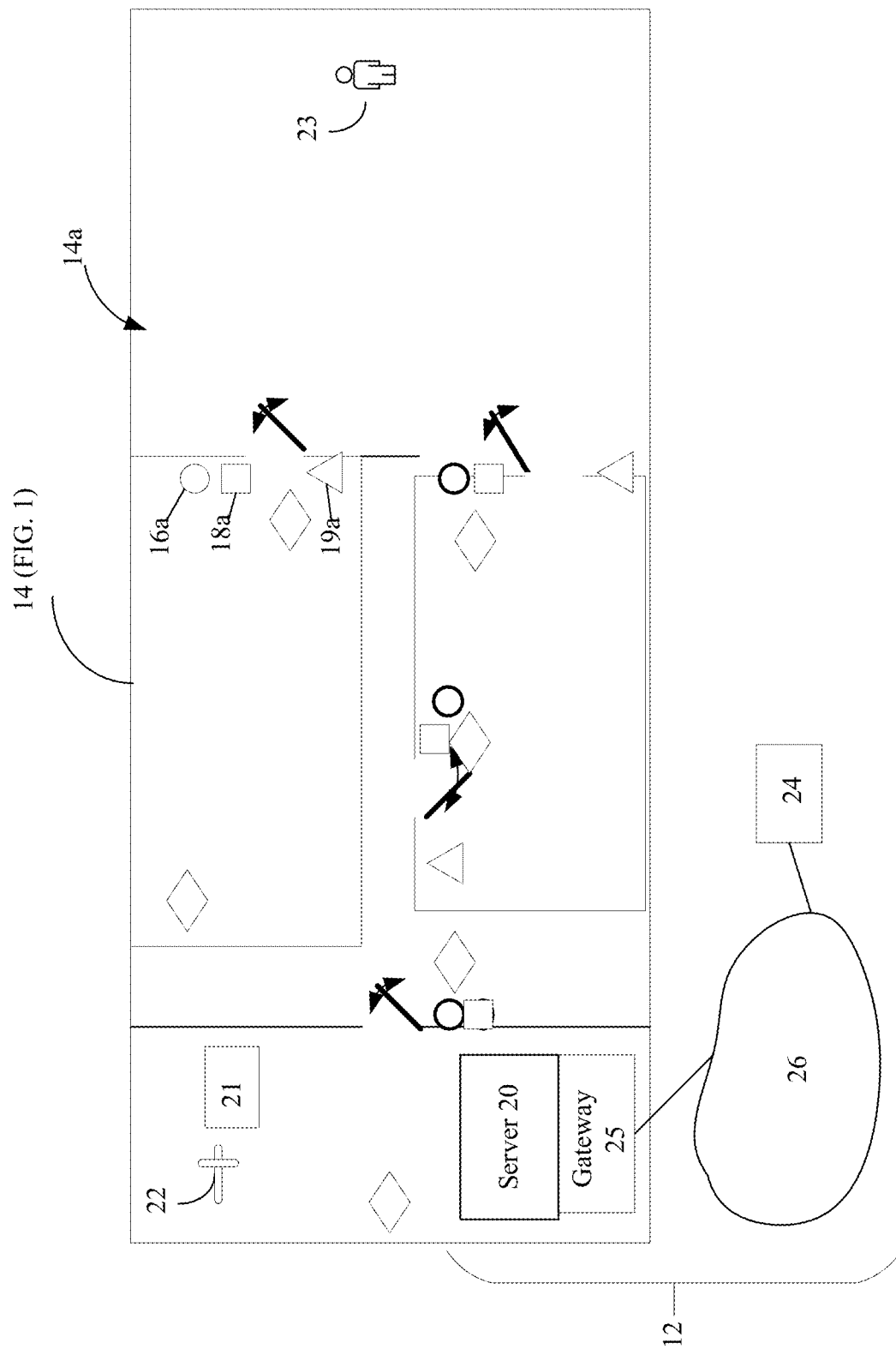

Referring now to FIG. 2, in some implementations whether involving drones 22 or robots 23, within the interior areas 14a of the facility 14 (more of which is shown) will have one or more stations 21 (UAV (unmanned aerial vehicle) or drone stations and/or robot stations). These stations 21 are bases where the UAV, drone, or robot can be recharged, programmed, etc.

A UAV (unmanned aerial vehicle) 22 commonly known as a drone is a remotely piloted airborne vehicle, i.e., an aircraft that does not have a human pilot aboard. However, a human controls the flight of the drone remotely or in some applications the flight of the drone is controlled autonomously by onboard computers.

A robot 23 is a combination of a mechanical machine controlled by a programmable computer that is capable of performing various actions/functions commonly performed by humans and more generally for performing a complex set of tasks. Robots of interest herein are those that are mobile and that include object avoidance capabilities that guide the robot about an environment to perform a specific task. Such robots may be constructed have a human-like appearance but in some implementations no regard is given to their appearance. Robots can be autonomous (i.e., perform program tasks with high autonomy, i.e., without significant human intervention) or semi-autonomous, (with significant human intervention).

A security system 12 is installed and includes a server 20 that is in communication with the drones 22 or robots 23 and a gateway 25 to send data to and receive data from a remote, central monitoring station 24 (also referred to as central monitoring center) via one or more data or communication networks 26 (only one shown), such as the Internet, the phone system or cellular communication system being examples of others. The server 20 receives signals from the plural drones. These signals include video signals from onboard cameras as well as location information.

FIG. 2 also shows fixed location markers (denoted by small diamonds) that are in interior portions 14a of the facility 14 (and can be external to the facility) and that can be any one of a number of technologies, as discussed below and act as identification, at least some of which are proximate to doors. Also shown are components of door access processing. These components include at least some of the fixed location markers (small diamonds) active door control modules generally, e. g., 16a, (denoted by small circles), card reader modules, e.g., 18a (denoted by small squares) and proximity sensors, e. g., 19a, (denoted by small triangles) disposed in proximity to doors, and apply to either the drone or the robot implementations. These components can be on one (as shown) or both sides of a doorway.

In some implementations, the drones carry several types of sensor/detectors. One type of sensor is a video camera that sends video data to the server 20. Examples of other types of sensors include microphones to send audio data. The sensors 28 may communicate wirelessly to the server 20 or can communicate through an on-board computer on the drone. In general, sensors 28 capture audio and video and send signals to the server 20. Based on the information received from the sensors 28, the server 20 determines whether to trigger and/or send alarm messages to the monitoring station 18. An operator at the remote control station can control certain actions of the drone. Similarly, a robot carries several types of sensor/detectors or the robot can be of a particular function, e.g., cleaning robot. As a cleaning robot the robot 23 would include a cleaning technology, e.g., vacuuming. Robots and drones would include navigation technologies and can include obstacle avoidance.

The data or communication network 24 may include any combination of wired and wireless links capable of carrying packet and/or switched traffic, and may span multiple carriers, and a wide geography. In one embodiment, the data network 24 may simply be the public Internet. In another embodiment, the data network 24 may include one or more wireless links, and may include a wireless data network, such as a 2G, 3G, 4G or LTE cellular data network. Further network components, such as access points, routers, switches, DSL modems, and the like possibly interconnecting the server 20 with the data network 24 are not illustrated.

Figure 3:
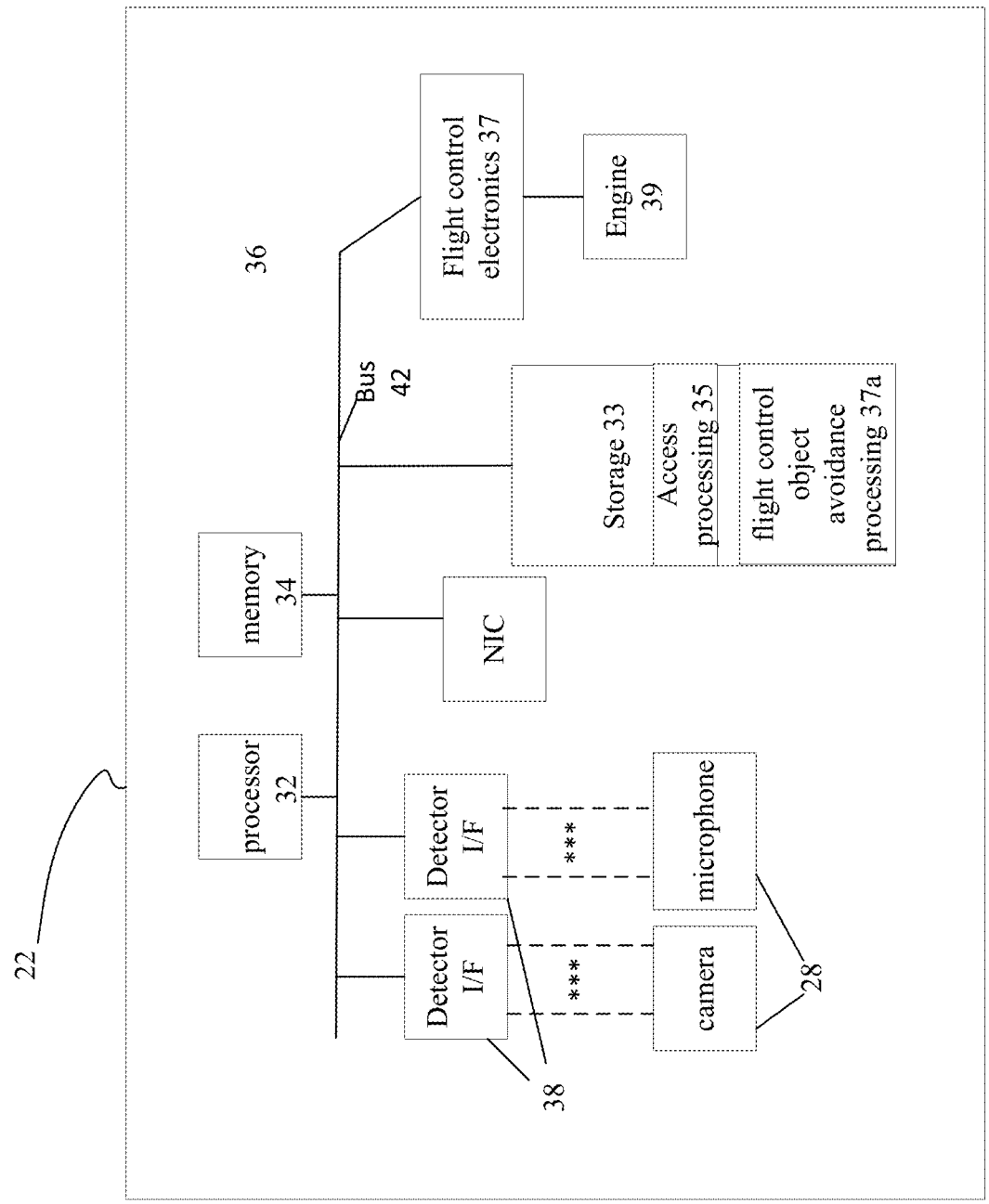
FIGS. 3 and 4 are block diagrams of drone and robotic control circuitry respectively.

Referring now to FIG. 3, details on an exemplary drone 22 are shown. The drone 22 includes processor 32 and memory 34, and storage 33 and a wireless network interface card (NIC) 36 all coupled via a bus 42. The drone 22 also includes one or more sensors 28 and one or more interfaces 38 to receive sensor data from the sensors 28. Illustrated for explanatory purpose are camera and microphone sensors 28 and interfaces 38 for those sensors. The sensors 28 are coupled to the interfaces 38 either via hard wiring or wirelessly. The drone 22 also includes flight control electronics 37 (and processing 37a) generally conventional, and one or more electric motors 39 to control one or more propellers (not illustrated). The drone 22 includes a body (not referenced) that can be either that of a plane or a helicopter. The drone flight control electronics 37 are response to control signals received by the processor via the wireless interface card that allow a remotely positioned operator to control flight of the drone and control the camera and microphone sensors 28 on the drone. The drone 22 also includes access processing 35 as will be discussed below.

Figure 4:
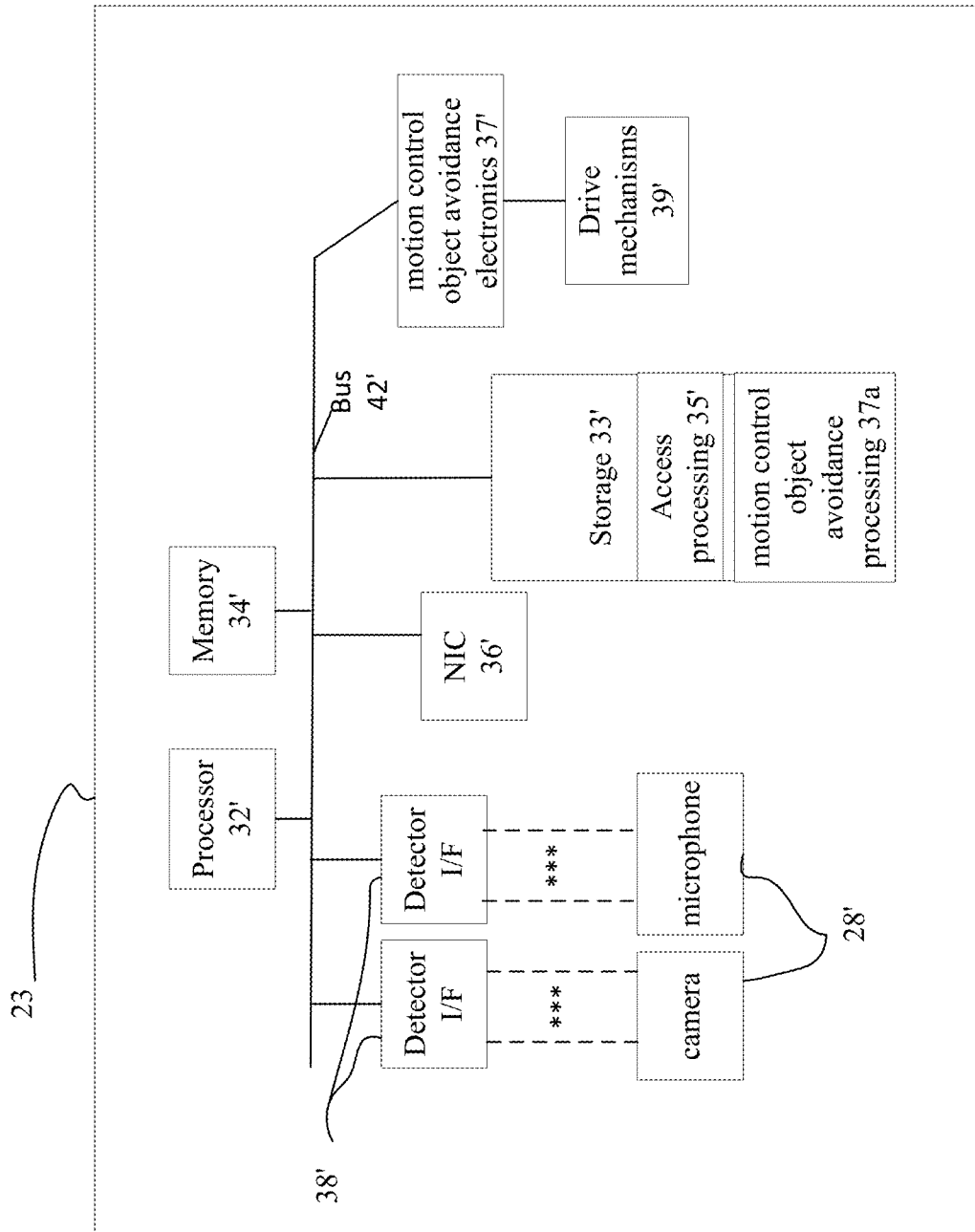

Referring now to FIG. 4, processing details on an exemplary robot 23 are shown. The robot 23 includes processor 32' and memory 34', and storage 33' and a wireless network interface card 36' (NIC) all coupled via a bus 42'. The robot 23 also includes one or more sensors 28' or operational devices (e.g., a vacuum cleaner device or any others) and one or more interfaces 38' to receive sensor data from the sensors, if so equipped. Illustrated for explanatory purpose are camera and microphone sensors 28' and interfaces 38' for those sensors 28'. The sensors 28' are coupled to the interfaces 38' either via hard wiring or wirelessly. The robot 23 also includes motion control/object avoidance and navigation electronics 37' and processing 37a' (generally conventional), etc. The robot 23 can include a body (not referenced) that can be merely a mechanical frame holding various appendages of the robot 23 or that of a humanoid appearance. The electronics are response to control signals received by the processor via the wireless interface card that allow either a remotely positioned operator to control the robot 23 or provide the robot 23 with autonomous control and control the camera and microphone 28' or function on the robot 23. The robot 23 also includes access processing 35' as will be discussed below.

Either the drone 22 or the robot 23 can be used for various purposes. For example, a drone can be guided through corridors etc. to reach a location of interest either by an operator or in an autonomous manner by following a programmed flight pattern and applying guidance processing to allow the drone to follow the pattern, i.e., without an operator at security monitoring station guiding all of the drone's movements. In the context of a facility that includes a security system, especially when the security system includes access control that requires human authentication to pass through a door, the conventional approaches to guidance of a drone 22 or robot 23 are insufficient.

Figure 5:
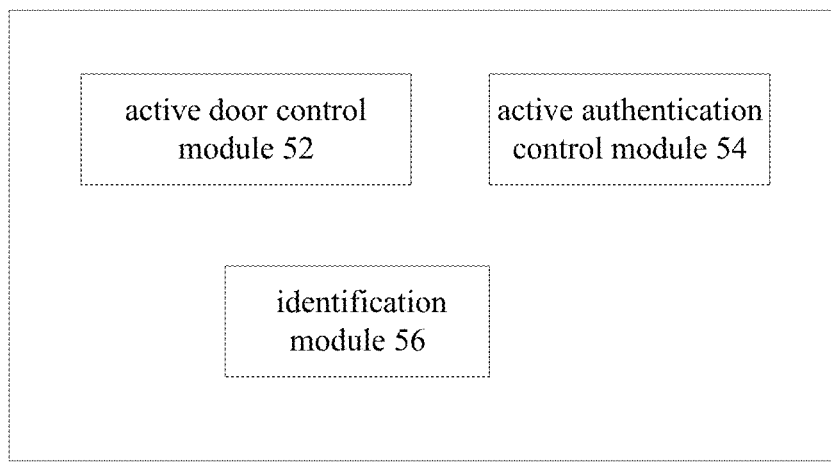
FIG. 5 is a block diagram of an access module.

Referring now to FIG. 5 components of the door access processing 35 or 35' are shown. These components apply to either the drone or the robot implementations. The door access system includes active door control module 52, active authentication control module 54 and identification module 56, generally one per door but in some examples one can serve several doors. The active door control module 52 includes processing that causes the drone or robot to send a request to an appropriate access controller device that controls access through a particular door. The request will include a message that indicates that the drone or robot seeks access through a particular door. The message will include the drone or robot ID from the identification module 56. In some implementations, an active authentication control module 54 is used to exchange credentials between the robot and the system performing the access processing, in a more secure manner than mere presentation of a drone or robot identification.

Authentication and tracking appliances are fixed, e.g., in physical locations inside the facility, e.g., at locations in the facility where there is a door (see FIGS. 1 and 2). These appliances can be beacons that send out a short distance message that identifies the appliance and hence the door associated with or at least adjacent to a door. The beacon message can include other credentials that are used in conjunction with credentials on the robot or drone to authenticate the beacon to the robot or drone or vice versa. Each beacon can be valid within respective assigned detection zones.

The drone 22 is programmed to fly a pattern around the inside of the facility, e.g., providing sensor data that can be in various forms, as mentioned above. Similarly, the robot 23 can move about the inside either carrying sensors for surveillance and/or performing tasks such as vacuuming. Other tasks that can be performed by either the robot or the drone are a visual inspection of items in the facility such as an inspection of fire extinguishers, or tasks such as people counting, in case of building evacuations. In the implementations, involving sensor data, the sensor data are sent back to the security monitoring center where, e.g., video or other data are stored and viewed.

The drone 22 (or the robot 23) will have a programmed pattern or plan that will include locations of doors that the drone or robot are allowed access to and the order in which the drone or robot accesses these doors. That is, the programmed pattern or plan assigned to the drone (or the robot) can be a fixed sequence meaning that the drone or robot follows a defined sequence or order of physically adjacent or proximate access requests through doors, which the robot 23 or drone 22 requests, one after the other. In other implementations, the pattern or plan involves randomizing or pseudo-randomizing the order that the drone or robot takes, so that, for example, a bad actor cannot predict where the autonomous mobile unmanned machines, e. g., robot/drone will or will not be at a certain time or where it will go next. The server 20 system and/or the central monitoring station continually receives signals from various sensors either on the drones or within the facility to track the drone or robot. The server 20 applies processing to the data to verify that the drone or robot are operating according to plan.

Figure 6:
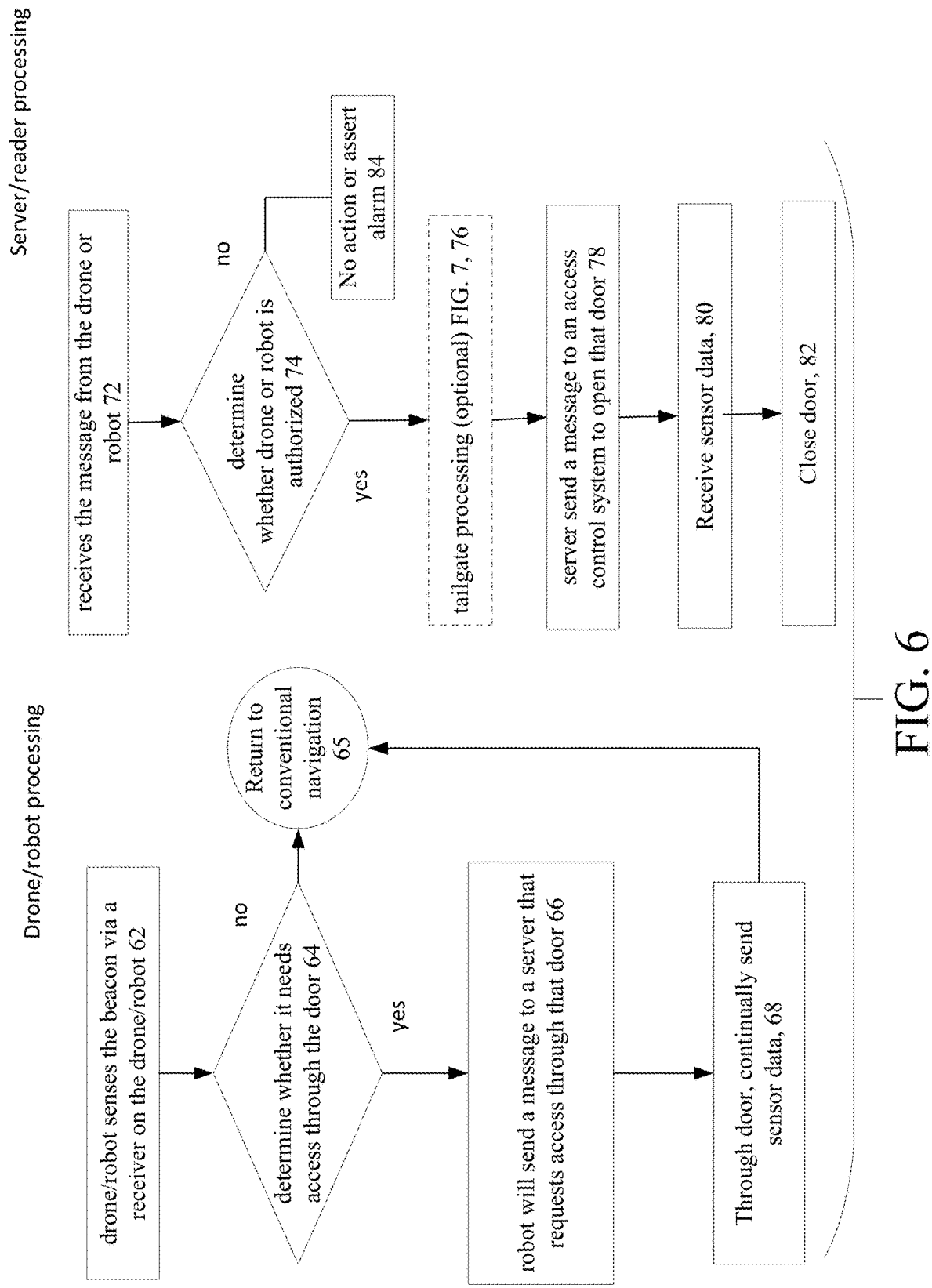

Referring to FIG. 6, irrespective how the drone is programmed to fly or the robot is programmed to move within a facility, exemplary door access processing 35 is as follows: the drone or robot senses 62 a beacon signal from a beacon associated with a door, via a beacon (r.f.) receiver on the drone or robot. The drone or robot will determine 64 whether the drone/robot needs access through the door. When the drone or robot determines it needs access through the door at the specified location identified by the beacon, the robot will send 66 a message to either a server or more likely the access control system that is modified to receive such messages. The sent message is a request to open the specific identified door. Upon the server/access control system unlocking the door, the appropriate one of those systems sends a message that is received from either the server 20 (FIG. 2) or the access control system that indicates the door has been unlocked, allowing the drone or robot to continue moving and to send to the server sensor data 68. When the drone or robot determines it does not need access through the door, the process can exit or return to its conventional navigation. When the drone or robot passes through the door, the drone or robot proceeds with its conventional navigation 65 until a next beacon.

The server (or access control system 16) receives 72 the message from the drone or robot and determines 74 whether the drone or robot is authorized (and optionally authenticated) to gain access through the door. Prior to or in conjunction with or after determining that the drone or robot is authorized (and optionally authenticated), the server 20 performs tailgate processing 76. When the server 20 or access control system 16 determines that drone or robot is authorized access through the door at the specified location identified by the beacon, and optionally at a specified authorized time, (and optionally authenticated), the server will send 78 a message to the access control system 16 or the access control system 16 will cause the electronic lock to unlock and in some instances will also open the identified door. The drone or robot continues to send and the server receives 80 sensor data over the flight path/movement path. Once drone or robot passes through the door, the drone or robot will return to conventional navigation and/or await detection of a next beacon.

The server either can sense that the robot has passed through the door, receives a message from the robot that it has passed through the door or wait a very short, defined time, allocated to ensure the robot has passed through the door, etc. before closing 82 the door. The time allocated would depend on a number of factors, including distance between drone/robot and door upon opening the door, the speed at which the robot/drone can travel, etc. This period can be relatively short, e.g., a second or so up to about a minute or less. A workable range would be 2 seconds to 10 seconds, but any numerical range within the above range would be within scope of the described subject matter.

Back at the server receiving 72 the message from the drone or robot, if the server 20 (or access control system 16) determines 74 based on the received message that the drone or robot is not authorized (and/or optionally not authenticated) to gain access through the door, no action can occur or an alarm can be asserted 84.

Referring now to FIG. 7, tailgate processing 76 is described. Once the drone or robot arrives at the specific location in the facility where the drone or robot is waiting for access, the drone hovers (or the robot waits) at that location in the facility by entering a hover mode/waiting mode to await opening of the door by the access control system 16. However, there exists a security concern while the drone or robot is waiting for the door to open (or even as the drone or robot approaches the door and detects the beacon). In this instance, an unauthorized entity, (or indeed an authorized entity), e.g., another robot/drone, or more likely a human, without proper credentials (e.g., badge, etc.) (unauthorized entity) or with proper credentials (e.g., badge, etc.) (authorized entity) can slip through the door with the robot and go undetected (tailgate).

The facility will include RFID detectors/sensors (proximity and/or r.f. id sensors). The proximity and/or r.f. id sensors (e.g., 19a) receive sensor signals (resulting from detection of r.f. id signals from cell phones or r.f. signals from badges to try to read 92 a badge or other credential. Alternatively, or in addition, other sensors such as a heat sensor or video surveillance cameras together with video analytics can be used to detect changes in heat (human presence). The system will read 92 any number of badges or receive the heat sensor data or results of video analytics processing 94 and detect presence of other entities (besides the drone/robot) in an area around the door 96. If none are detected, the processing returns to server processing 78 (FIG. 6).

Badges can be detected using an r.f. id antenna having a suitable range of operation, e.g., 50-500 cm or 50-100 cm or so. The credentials for these badges are sent to the server and the server determines whether any of these are not authorized access through the door. Note RFID is but one technology. Other technologies for such detection of a human can involve or include Bluetooth, facial recognition using video analytics on video signals. Typically, RFID in access control is a "near field" technology only. So sweeping an area for RFID tags may not be typical. More likely, the system can command the person to present an access badge to the reader before the system allows access to the drone or robot.

When any of the read badges that may be in the area around the door are not authorized access through the door, the server will determine an appropriate response(s) 98, and issue 100 the response indication, e.g., an alarm, or a message to the drone or robot to wait and retry at a future time, transfer control to a human operator, and may assert another type of alarm. Also, the door remains locked.

The detectors/sensors can also include proximity and r.f. sensors that sense electronic devices using an r.f. antenna having a suitable range of operation, e.g., 50-500 cm or 50-100 cm and the other sensors such as the heat sensors in proximity to the door. If those sensors detect a person (e.g. by detection of a heat signature of a person or presence of an r.f. device, e.g., a tablet computer or cell, e.g., smart phone), but without any credentials, the system will issue an indication, e.g., an alarm or a message to the drone or robot to wait and retry at a future time and more likely will assert another type of alarm to the security system.

In addition, or alternatively, a camera can be used to view the drone or robot and capture video analytics can be used to determine if any other entities are adjacent the door. The video analytic processing upon detection of unauthorized entities will modify the drone fly pattern or the robot movement pattern to wait until the other entities have passed. When the drone or robot is in autonomous mode, the modified pattern can be accomplished by the server 20 producing a new pattern taking into consideration results of analytics processing and reprogramming the drone or robot with the new pattern. Alternatively, the server 20 can cause the control of the drone or robot to be transferred to an operator.

If intrusion is detected by other sensors within a facility, such as a window being opened or a glass break detector or a shot, e.g., gunshot being detected, e.g., a "live shooter" incident, such systems contact the server 20 and suspend all drone or robot movements through closed doors.

Within the facility guidance of a drone or robot are accomplished various well-known processing techniques that are generally available in commercial drones 22 or robots 23. Such techniques include use of feature recognition to follow a preprogrammed map of the interior of the facility. Another type of navigation is a map based type navigation that includes a database that stores images of landmarks, descriptions of items and navigation instructions. A third type of navigation is by r.f. (radio frequency) beacons being deployed within the facility, sending out r.f signals that a guidance system on board the drone or robot captures and uses to apply a triangulation algorithm to figure out a current location. The guidance techniques can be r.f.-based, sonar-based or optical-based. Guidance can be assisted by use of commercially available virtual wall barriers.

Consider the implementation of a robot. A commercially available robot such as the iRobot Roomba® (iRobot, Inc.) 900-980 series can be used for its well-known cleaning function and would be modified to include a processor such as a Raspberry Pi® (a series of small single-board computers provided through the Raspberry Pi Foundation) processor or equivalent that would perform the processing discussed herein, obviating the need for revamping processing of such commercial robots. However, modification of on-board processing performed by the robot is within the scope of an equivalent. Considering the robot as a platform, the platform thus would require a processor, memory, storage and communication channel in order to be able to communicate with the security system or at least the relevant portions of the access control system. Similar modifications would be provided when the platform used was a drone.

The access control system can use public key infrastructure (PKI) that is a set of hardware, software, people, policies, and procedures needed to create, manage, distribute, use, store, and revoke digital certificates and manage public-key encryption for secure electronic transfer of information to improve upon simple authentication techniques by merely presenting a fixed set of credentials from the platform to the access control system. In cryptography, PKI binds public keys with respective user identities by means of a certificate authority (CA) within a CA domain. The user identity is unique within each CA domain, thus such uniqueness could be associated with the platform, e.g., the robot or drone.

Drone Characteristics

Drones employed herein are selected according to the type and nature of the surveillance. For example, when the drones are employed to hover, a helicopter type drone might be preferable to an airplane type drone. A drone within the building that has wide open spaces can be in general larger than one employed in a building that has many rooms and corridors. Thus, a typical wing span for a drone in may wide open spaces can be 1 to 5 feet (0.3 to 1.5 meters), whereas inside the wing span would likely be less than 1 foot (0.3 meters) or no greater than the width of the smallest door opening. In addition, when used inside the drone should be powered electrically, e.g., fuel cell and/or batteries. These are however general considerations and specific applications would govern actual implementations. Various sensors can be carried by the drone, thus sensors include microphones to sense sound, and cameras to capture images and/or video. However, other sensors can include sensors to capture motion, vibration, pressure, heat, and so forth, in an appropriate combination to detect a true condition in a facility.

Robot Characteristics

Robots employed herein are selected according to the type and nature of the function that can be either a security function and/or another function, such as cleaning. For example, when robots are employed to clean, any style may be used but when employed for security, a humanoid type might be preferred. A robot within the building should have a width dimension no greater than the width of the smallest door opening. In addition, the robot should be powered electrically, e.g., fuel cell and/or batteries. These are however general considerations and specific applications would govern actual implementations. Various sensors can be carried by the robot as with the drone discussed above.

The memory stores program instructions and data used by the processor. The memory may be a suitable combination of random access memory and read-only memory, and may host suitable program instructions (e.g. firmware or operating software), and configuration and operating data and may be organized as a file system or otherwise. The program instructions stored in the memory may further store software components allowing network communications and establishment of connections to the data network.

Door Characteristics

When robots are employed, the characteristics of the doors may be more flexible than when drones are employed. As a baseline, the doors have associated access control systems. The doors are electrically powered doors that have an electronic locking mechanism controlled by the access control system. The electrically powered doors automatically open and close electronically upon actuation by the access control system or the like. However, in some instances, the doors after being unlocked could be pushed open by a robot using a robot capable of applying the requisite force to open the door. For example, under the American Disabilities Act, closure hardware are required to be activated by no more than 5 lbs. of applied force to open the door. If the robot could apply the requisite force to open the door, such a closure could be used in lieu of the automatic electrically powered doors, as mentioned above.

Program instructions stored in the memory along with configuration data may control overall operation of the drone or robot, modified as discussed above to provide the functionality disclosed herein.

An example monitoring station can be a single physical monitoring station or center in FIG. 2. However, it could alternatively be formed of multiple monitoring centers/stations, each at a different physical location, and each in communication with the data network. The central monitoring station includes one or more monitoring server(s) each processing messages from the drones and/or user devices (not shown).

The monitoring server may include a processor, a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with the memory that stores processor executable instructions controlling the overall operation of the monitoring server. Suitable software enables each monitoring server to receive alarms and cause appropriate actions to occur. Software may include a suitable Internet protocol (IP) stack and applications/clients.

Each monitoring server of central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service. The network interface may be a conventional network interface that interfaces with the network (FIG. 1) to receive incoming signals, and may for example take the form of an Ethernet network interface card (NIC).

Servers can be any of a variety of computing devices capable of receiving information, such as a server, a distributed computing system, a rack-mounted server and so forth. Server may be a single server or a group of servers that are at a same location or at different locations. Servers can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Hardware storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Other embodiments are within the scope of the following claims.

What is claimed is:

1. A method, comprising:
   programming an autonomous mobile unmanned machine to pass through a particular location within a facility that has one or more doors;
   receiving by the autonomous mobile unmanned machine a beacon signal emanating from a beacon deployed in proximity to a first one of the one or more doors in the facility, by receiving the beacon signal by a receiver device on the autonomous mobile unmanned machine;
   determining by the autonomous mobile unmanned machine whether the autonomous mobile unmanned machine needs access through the first door;
   sending a message to either a server or an access control system when the autonomous mobile unmanned machine determines that it needs access through the first door at a specified location identified by the beacon;
   receiving a message from either the server or the access control system, the message indicating that a tailgating user is present; and
   causing by the autonomous mobile unmanned machine, the autonomous mobile unmanned machine to enter a manual operation mode where movement of the autonomous mobile unmanned machine is controlled manually by a user in response to the reception of the message indicating that the tailgating user is present.

2. The method of claim 1, further comprising:
   exchanging credentials with the access control system or a security system to cause the access control system or the security system to authenticate the autonomous mobile unmanned machine.

3. The method of claim 1 wherein the autonomous mobile unmanned machine is a robot or a drone.

4. The method of claim 1, further comprising:
   detecting by the access control system by reading badges or other credentials or other devices a presence of one or more entities in proximity to the first door.

5. The method of claim 4 wherein:
   when any of the badges are not authorized access through the door, issuing, by the server, an indication to the autonomous mobile unmanned machine to wait and retry entry through the first door at a future time.

6. The method of claim 1, further comprising:
capturing by a camera of the autonomous mobile unmanned machine video to determine if entities are adjacent the first door.

7. The method of claim 1, further comprising:
detecting by the autonomous mobile unmanned machine unauthorized entities; and
modifying a drone fly pattern or a robot movement pattern to wait until the unauthorized entities have passed.

8. A method, comprising:
receiving by a server or access control system a message from an autonomous mobile unmanned machine, which is a request by the autonomous mobile unmanned machine for access through a door;
determining whether the autonomous mobile unmanned machine is authorized to gain access through the door, and if so
sending a message to the access control system to cause electronic locks on the door to unlock the door;
receiving a message indicating that a tailgating user is present; and
causing by the autonomous mobile unmanned machine, the autonomous mobile unmanned machine to enter a manual operation mode where movement of the autonomous mobile unmanned machine is controlled manually by a user in response to the reception of the message indicating that the tailgating user is present.

9. The method of claim 8 wherein a facility includes sensors that read badges or other credentials or other devices, the method further comprising:
detecting by reading of the badges or other credentials or other devices a presence of one or more entities in proximity to the door.

10. The method of claim 9 wherein when any of the badges detected or read in the area around the door are not authorized access through the door, the server will issue an indication to wait and retry at a future time and asserts another type of alarm.

11. The method of claim 9 wherein when a camera captures video processed by video analytics to determine if any other entities are adjacent the door.

12. The method of claim 8 wherein the autonomous mobile unmanned machine is a robot or a drone.

13. The method of claim 8 wherein the autonomous mobile unmanned machine is a drone or robot, the method further comprising upon detection of unauthorized entities:
modifying a drone fly pattern or a robot movement pattern to wait until the unauthorized entities have passed.

14. The method of claim 8 wherein when an intrusion is detected within a facility by a detecting system, wherein the detecting system sends messages to the server or the access control system which suspend all autonomous mobile unmanned machine movements through closed doors.

15. An autonomous mobile unmanned machine comprises:
a computer carried by the autonomous mobile unmanned machine to control passage of the autonomous mobile unmanned machine;
at least one sensor carried by the autonomous mobile unmanned machine, with the computer configured to cause the autonomous mobile unmanned machine to:
receive by the autonomous mobile unmanned machine a beacon signal emanating from a beacon, wherein the beacon is deployed in proximity to a first one of one or more doors in a facility, by receiving the beacon signal by a receiver device on the autonomous mobile unmanned machine;
determine by the autonomous mobile unmanned machine whether the autonomous mobile unmanned machine needs access through the first door;
send a message to either a server or an access control system when the autonomous mobile unmanned machine determines that it needs access through the first door at a specified location identified by the beacon; receive a message from either the server or the access control system that the first door has been unlocked;
receive a message from either the server or the access control system, the message indicating that a tailgating user is present; and
enter a manual operation mode where the movement of the autonomous mobile unmanned machine is controlled manually by a user in response to the reception of the message indicating that the tailgating user is present.

16. The autonomous mobile unmanned machine of claim 15 wherein the computer carried by the autonomous mobile unmanned machine is programmed to pass through a particular location within the facility that has the one or more doors.

17. The autonomous mobile unmanned machine of claim 15 wherein the autonomous mobile unmanned machine is a robot or a drone and the sent message is a request to open the first door.

18. The autonomous mobile unmanned machine of claim 15 wherein the autonomous mobile unmanned machine is configured to:
exchange credentials with the access control system or a security system to cause access control system or the security system to authenticate the autonomous mobile unmanned machine.

19. An access control system, comprising:
a computing system, configured to:
receive from an autonomous mobile unmanned machine a message that the autonomous mobile unmanned machine needs access through a door;
determining whether the autonomous mobile unmanned machine is authorized to gain access through the door;
exchanging credentials with the autonomous mobile unmanned machine to cause the computing system to authenticate the autonomous mobile unmanned machine;
receive sensor data by detecting one or more badges or other credentials or other devices indicating a presence of one or more entities in proximity to the door;
process the sensor data and when the sensor data indicates that any of the badges detected or read in an area around the door are not authorized access through the door;
issue an indication to the autonomous mobile unmanned machine to wait and retry at a future time;
receive a message indicating that a tailgating user is present; and
cause by the autonomous mobile unmanned machine, the autonomous mobile unmanned machine to enter a manual operation mode where movement of the autonomous mobile unmanned machine is controlled manually by a user in response to the reception of the message indicating that the tailgating user is present.

20. The system of claim 19 wherein the autonomous mobile unmanned machine is a robot or a drone and the sent message is a request to open the door.

* * * * *